United States Patent
Bernadac et al.

(10) Patent No.: US 7,392,459 B2
(45) Date of Patent: Jun. 24, 2008

(54) METHOD AND APPARATUS FOR PREVENTING A FALSE PASS OF A CYCLIC REDUNDANCY CHECK AT A RECEIVER DURING WEAK RECEIVING CONDITIONS IN A WIRELESS COMMUNICATIONS SYSTEM

(75) Inventors: Pierre Bernadac, Lannion (FR); Peter Christian Gunreben, Bavaria (DE); Hongwei Kong, Denville, NJ (US); Jean Paul Moreau, Lannion Cedex (FR)

(73) Assignee: Lucent Technologies Inc., Murray Hill, NJ (US)

( * ) Notice: Subject to any disclaimer, the term of this patent is extended or adjusted under 35 U.S.C. 154(b) by 496 days.

(21) Appl. No.: 10/823,948

(22) Filed: Apr. 14, 2004

(65) Prior Publication Data

US 2005/0235192 A1  Oct. 20, 2005

(51) Int. Cl.
  *H03M 13/45* (2006.01)
  *H03M 13/41* (2006.01)
(52) U.S. Cl. .................. 714/780; 714/794; 714/795
(58) Field of Classification Search ................. 714/780, 714/794, 795
  See application file for complete search history.

(56) References Cited

U.S. PATENT DOCUMENTS

| 5,263,033 | A | * | 11/1993 | Seshadri | 714/792 |
|---|---|---|---|---|---|
| 5,287,516 | A | * | 2/1994 | Schaub | 375/334 |
| 5,327,439 | A | * | 7/1994 | Estola et al. | 714/795 |
| 5,491,705 | A | * | 2/1996 | Pradhan et al. | 714/795 |
| 5,577,053 | A | * | 11/1996 | Dent | 714/755 |
| 5,586,128 | A | * | 12/1996 | Chen | 714/792 |
| 5,606,569 | A | * | 2/1997 | MacDonald et al. | 714/758 |
| 5,745,502 | A | * | 4/1998 | Khayrallah et al. | 714/751 |
| 6,061,823 | A | * | 5/2000 | Nara | 714/758 |
| 6,085,349 | A | * | 7/2000 | Stein | 714/778 |

OTHER PUBLICATIONS

Dholakia, A., Introduction to Convolutional Codes with Applications, Kluwer Academic Pub., 1994, p. 120.*

* cited by examiner

*Primary Examiner*—Stephen M. Baker

(57) ABSTRACT

At the receiver in a wireless communications system, the likelihood of a false CRC pass that can occur when a weak received signal produces an all ZERO output from a convolutional or a turbo decoder is minimized. To prevent an all ZERO output, a convolutional decoder selects from among those determined equally most likely transmitted sequences of bits in a data block one that has a weight greater than the one having the minimum weight. A turbo decoder selects a ONE rather than a ZERO as the value of a transmitted bit in a data block when for that bit a bit value of a ZERO and a ONE are determined to be equally likely.

9 Claims, 8 Drawing Sheets

METHOD AND APPARATUS FOR PREVENTING A FALSE PASS OF A CYCLIC REDUNDANCY CHECK AT A RECEIVER DURING WEAK RECEIVING CONDITIONS IN A WIRELESS COMMUNICATIONS SYSTEM

TECHNICAL FIELD

This invention relates to wireless communications, and more particularly, to preventing the false pass of a Cyclic Redundancy Check (CRC) at a receiver when signal conditions are weak.

BACKGROUND OF THE INVENTION

3GPP UMTS and 3GPP2 cdma2000-1x EVDO (or EVDO herein after) standards specify the use of convolutional and/or turbo coding as an error correction method to protect the transmitted data between a base station, referred to as NodeB in UMTS terminology, and a mobile terminal, referred to as user equipment (UE) in UMTS terminology. A CRC code is also applied as a measure of error detection to detect errors that cannot be corrected by the convolutional or turbo decoder to guarantee the integrity of a data block before reporting it to the higher layer. The CRC is defined by its generating polynomial and the initial state of the CRC generator. The current 3GPP UMTS/3GPP2 EVDO standards specify the initial state for the CRC generator to be all ZEROs. When receiving conditions are weak, meaning that the received signal strength has become insufficient to support the radio-like normal operations, problems can arise through this selection of an initial state causing a false pass to be generated for a block of data when it should otherwise really be a fail due to the inaccuracy of a detected block of bits. This can happen when the UE is in a soft handoff mode when one or more radio links are significantly weaker than others, or when the UE temporarily goes into a deep fade, but will exit the fade before the network can disable the radio link.

In a receiver at either a NodeB or a UE, after a received Code Division Multiple Access (CDMA) signal is despread and demodulated, the output is a sequence of soft symbol metric values consisting of signed numeric values, which are inputted to either a convolutional decoder or a turbo decoder to determine the transmitted bit stream. In weak receiving conditions, each of the soft symbol metric values at the output of the demodulator are likely to have close to a zero value. In the convolutional decoder, in processing an input sequence of soft symbol metric values associated with a block of data, the likelihood of each possible transmitted bit sequence is calculated and the sequence with the largest likelihood is used to determine the transmitted sequence. When the received signal is weak and the soft symbol metric values are likely all close to a zero value, there is a high probability that multiple code sequences will have the same likelihood, which is also a maximum among all possible code sequences. Among these equal maximum likelihood sequences is always the all-ZERO sequence. The convolutional decoder picks the code sequence with the least weight so that in a weak signal condition, the all ZERO sequence is always chosen as having been the transmitted sequence. In the turbo decoder, in processing an input sequence of soft symbol metric values in a block of data, two likelihood values of each bit are calculated (one for bit value ZERO and the other for bit value ONE) and for each bit the bit value with the larger likelihood is outputted. When the received signal is weak and each soft symbol metric value is close to zero, there is a high probability that the two likelihood values for a bit are the same for all the bits in the data block. The decoder picks the bit value ZERO for each bit and thus produces an all-ZERO decoded bit stream for the block.

In weak signal conditions, therefore, both the convolutional decoder and the turbo decoder produce an all-ZERO output sequence resulting in an all ZERO decoded bit stream consisting of blocks that have an all-ZERO data part and an all-ZERO CRC part, regardless of what actually has been transmitted. When the initial state for the CRC recalculation at the receiver is set to all ZEROs, an inputted all-ZERO data part for the CRC recalculation results in an all-ZERO CRC, which then matches the all-ZERO CRC part in the decoded block. A CRC pass is then declared for this data block regardless of the fact that the transmitted data has been totally corrupted by noise and/or interference. The result of this false pass can be significant. For voice calls, the receiver passes bad data (i.e., all ZEROs) to the vocoder, which can cause screech on the receiving end when the UE goes into deep fade for up to a 16 frame period (160 ms) before the network makes the decision to disconnect the radio link. For data calls, an all ZERO input can result in a hang-up of the connection, requiring the connection to be reset.

Since the initial state of the CRC generator has been set by the standards to be ZERO and has been implemented in equipment already installed, the initial state of the CRC generator cannot be changed to avoid the problem. A solution is needed, therefore, to avoid false CRC-passes at a NodeB or UE receiver when receiving conditions are weak.

SUMMARY OF THE INVENTION

In accordance with an embodiment of the present invention, in determining the transmitted bits from input soft symbol metric values associated with a block of data on either a bit-by-bit basis, or on a sequence of bits basis, when on a bit-by-bit basis a ZERO or a ONE bit value are determined to be equally likely, or when on a sequence of bits basis more than one sequence of bits is determined to have a same maximum likelihood, a methodology is used other than always selecting ZERO as the transmitted bit value or selecting the sequence of bits that has the least weight. Thus, on a bit-by-bit basis as is performed by a turbo decoder, for example, a bit value of ONE is chosen as the transmitted bit value rather than a ZERO when both a ONE and a ZERO are determined to be equally likely. On a sequence of bits basis as is performed by a convolutional decoder such a Viterbi decoder, for example, when multiple sequences are determined to have a same maximum likelihood, rather than always selecting as the transmitted sequence the sequence whose weight is the smallest, a sequence whose weight is greater than the smallest is chosen, as for example, the sequence whose weight is the largest. By so changing the paradigm used to determine the transmitted bits by the turbo decoder and the transmitted bit sequence by the convolutional decoder in this manner, an input sequence of near zero-value soft symbol metrics caused by weak signal conditions will not produce an all ZERO decoded output bit sequence. Thus, when a CRC calculation and check is performed on this decoded output sequence, the CRC check will fail with high certainty, producing the desired CRC fail in the presence of a weak signal and the decoded sequence will not then be passed forward for further processing. In other embodiments, other methodologies can be used to break a tie of maximum likelihood values. For example, on a bit-by-bit basis, a bit can be chosen randomly when the determined likelihoods of a ZERO and a ONE are the same. On a sequence of bits basis, when multiple sequences are determined to have the same maximum likelihood, a random selection of the sequence of bits from among those with maximum likelihood can be chosen as the transmitted sequence either including or excluding the sequence with minimum weight.

DETAILED DESCRIPTION

Figure 1:
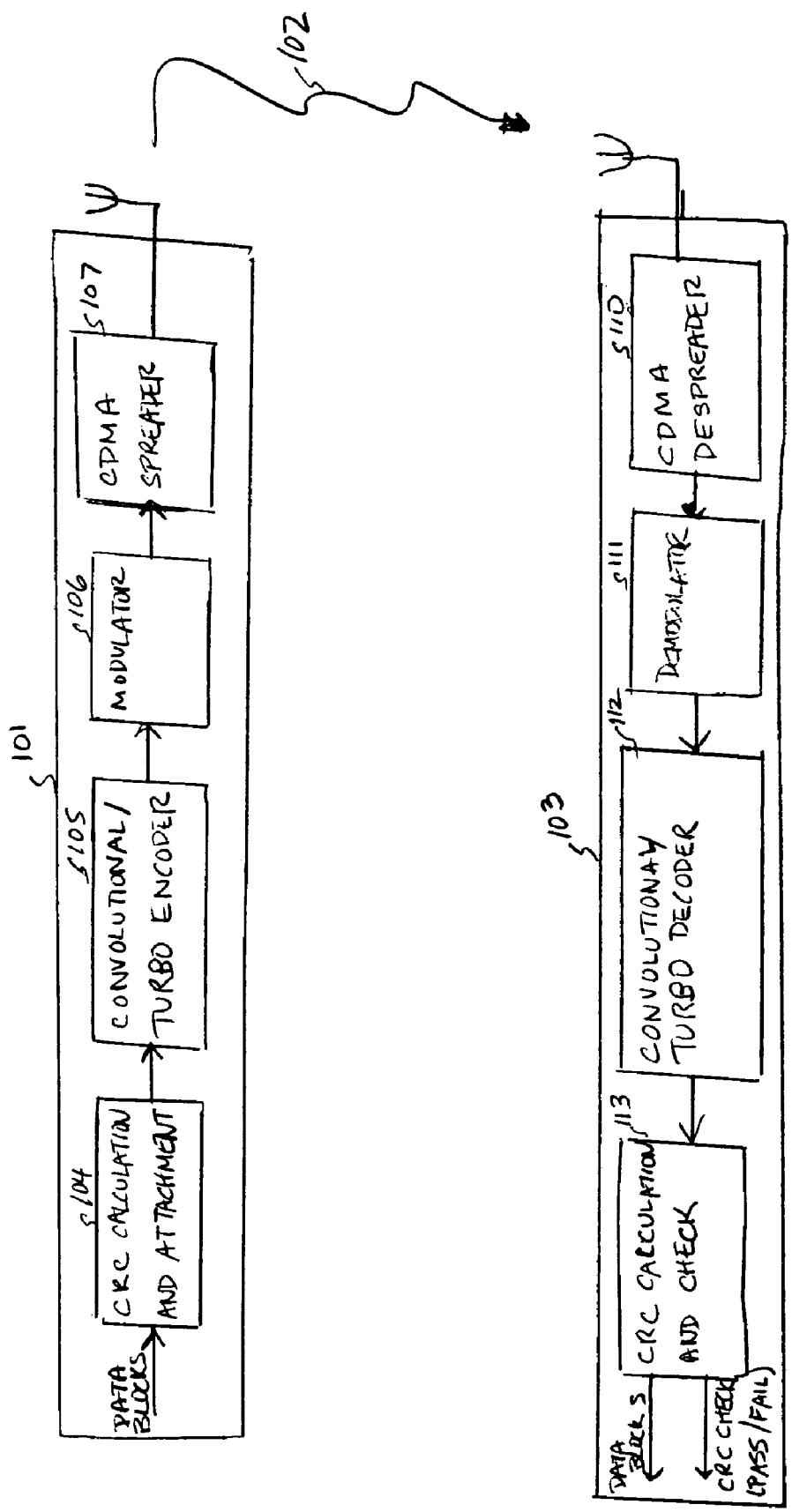
FIG. 1 is a block diagram of a 3GPP UMTS/3GPP2 EVDO wireless communications system.

With reference to FIG. 1, a high-level block diagram of a 3GPP UMTS/3GPP2 EVDO wireless communications system is shown. The transmitter 101 can be in the NodeB, which is transmitting downlink over propagation channel 102 to the receiver 103 in the UE. Alternatively, the transmitter 101 can be in the UE, which is transmitting uplink over the propagation channel 102 to the receiver 103 in the NodeB. At transmitter 101, a bit stream to be transmitted representing a coded voice signal or data is inputted to a CRC calculation and attachment device 104. The input bit stream consists of data block of, for example, 10 bits. As is well known in the art, CRC calculation and attachment device 104 using a predefined generating polynomial and predefined initial state generates a set of CRC bits, which are attached to the input block. For example, as will be detailed herein below, if an 8-bit CRC is calculated, those eight CRC bits are appended to the 10-bit input block to produce for that 10-bit input block, an output sequence of 18 bits B: $\{b_0 b_1 \ldots b_{17}\}$. That 18-bit block B is inputted to an encoder 105 that uses one but not both of convolutional encoding and turbo encoding. A higher level of processing determines selection of the type of encoding based on various factors such as the type of data that the input block contains. That selection process is not relevant to the description of the embodiment of the present invention and will not be discussed further. If encoder 105 is assumed to be a half-rate encoder, the output consists of twice the number of input bits, or 36 bits for the example of an 18-bit input. The output of encoder 105 is inputted to a modulator 106, which for an exemplary BPSK modulator produces a set of symbols S: $\{s_0 s_1 \ldots s_{35}\}$ that corresponds to the ONEs and ZEROs in modulator's 36-bit input, where each input ZERO is converted to a symbol of +1 and each input ONE is converted to a symbol of −1. The set of symbols S at the output of modulator 106 is then inputted to a spreader 107, which performs CDMA spreading in a conventional manner for transmission over the propagation channel 102.

At the receiver 103, a despreader 110 despreads the received CDMA signal and demodulator 111 demodulates the despread signal to produce the soft symbol metric values R: $\{r_0 r_1 \ldots r_{35}\}$, where each symbol $r_i$ corresponds to a transmitted symbol $s_i$. Generally, the metric for each coded bit is in the format of a real number, with its sign representing whether it is a ZERO or a ONE, and the magnitude of the value representing how likely the sign is correct. The output of the demodulator 111 is inputted to a decoder 112, which takes its soft symbol metric value inputs and determines the most likely transmitted bits. As will be described, when the set of bits B $\{b_0 \ldots b_{18}\}$ are encoded by encoder 105 using a convolutional encoding, decoder 112 is a Viterbi decoder, which decodes the sequence B as a whole. When the bits B are encoded by encoder 105 using turbo encoding, decoder 112 is a turbo decoder, which decodes each bit in the sequence bit-by-bit.

The decoded bit stream, consisting of a data block of 18 bits that includes a 10-bit data part and an 8-bit CRC part, is inputted to a CRC calculation and check device 113. Device 113 calculates a CRC from the 10-bit data part in the same manner that it was calculated by device 104 in the transmitter 101, and then compares the result with the received CRC part. If the calculated CRC matches the received CRC part, device 113 outputs a CRC Pass together with the data block. If the calculated CRC does not match the received CRC part, then a CRC Fail is declared and the data part is not passed forward.

Figure 2:
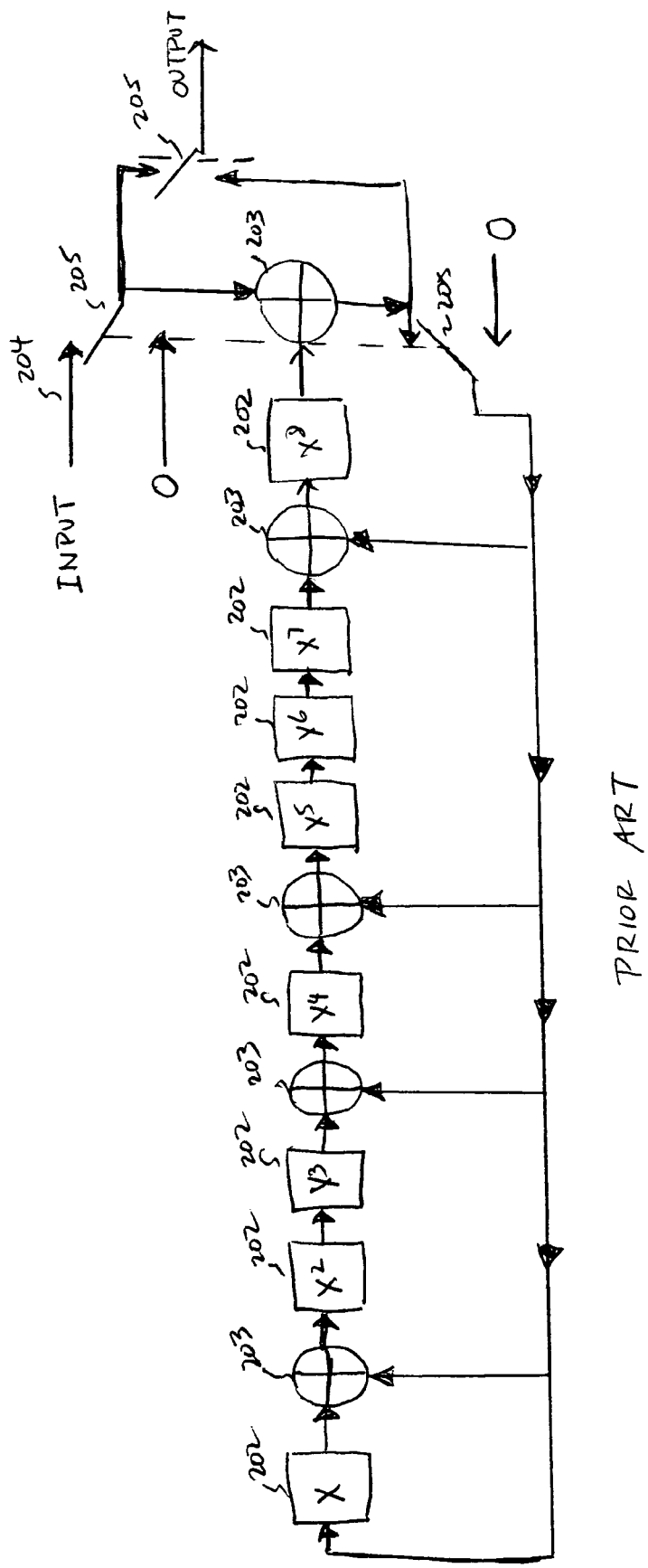
FIG. 2 shows an example of an 8-bit CRC generator.

FIG. 2 shows a CRC generator 201 for an 8-bit CRC that uses an exemplary generating polynomial $g(x)=x^8+x^7+x^4+x^3+x+1$. Such a structure is well known to those skilled in the art and is readily configured based on the generating polynomial. Each of the eight storage units 202 stores one bit and each of the five adders 203 performs modulo-2 addition. As noted in FIG. 2, each storage unit represents $x^n$ for n=1 to n=8. At the transmitter 101 in FIG. 1, the 10 bits in an input data block in FIG. 2 are read in bit-by-bit on input 204 when switches 205 are each in their up positions. Thus, each input bit is directly fed to the output and is fed back to be combined with the previous bit stored in a storage unit where indicated. As previously noted, the initial state of the generator 201 is such that each storage unit initially contains a ZERO. After the 10 input bits have been sequentially clocked in and processed by the generator, switches 205 are moved to their down positions and the eight bits stored in the eight storage units 202 are clocked to the output 206, thereby being appended to the 10 input bits that preceded them and thereby forming the 18-bit input B to the encoder 105. The actual order of transmission of the CRC bits to the encoder is standards specific. In 3GPP UMTS, the first clocked CRC bit is the last and the last clocked CRC bit is the first to go into the encoder, while in 3GPP@EVDO, it is the reverse order. During this same 8-bit period, ZEROs are clocked into storage units 202 so that at the end of this 8-bit period each storage unit contains the desired initial ZERO state.

With reference again to FIG. 1, at the receiver 103, the first 10 bits at the output of decoder 112 are inputted to a CRC generator 201 to produce an 8-bit output which is then compared with the last 8 bits of the decoder 112 output. At the receiver 103 a CRC Pass is declared only if there is agreement between both 8-bit sequences. As previously noted, the 3GPP standards specify that initial state of the CRC generator to be all-ZERO, i.e., a ZERO is initially set in each storage device 202. Thus, if at the receiver 103 all 18 bits at the output of decoder 112 are ZERO, generator 201 in FIG. 2 produces an 8-bit all-ZERO CRC, which matches the 8-bit all-ZERO CRC bits within the 18-bit output of decoder 112. As a result, a Pass is given to the 10-bit all-ZERO data. As previously noted, this is problematic because, as will be described in detail below, in the prior art, decoder 112 produces an all-ZERO decoded bit stream when the received signal is weak, regardless of what has been transmitted by the transmitted. Thus, a false Pass is generated when what really is desired is a CRC Fail under such weak signal conditions where the received data is in error.

Figure 3:
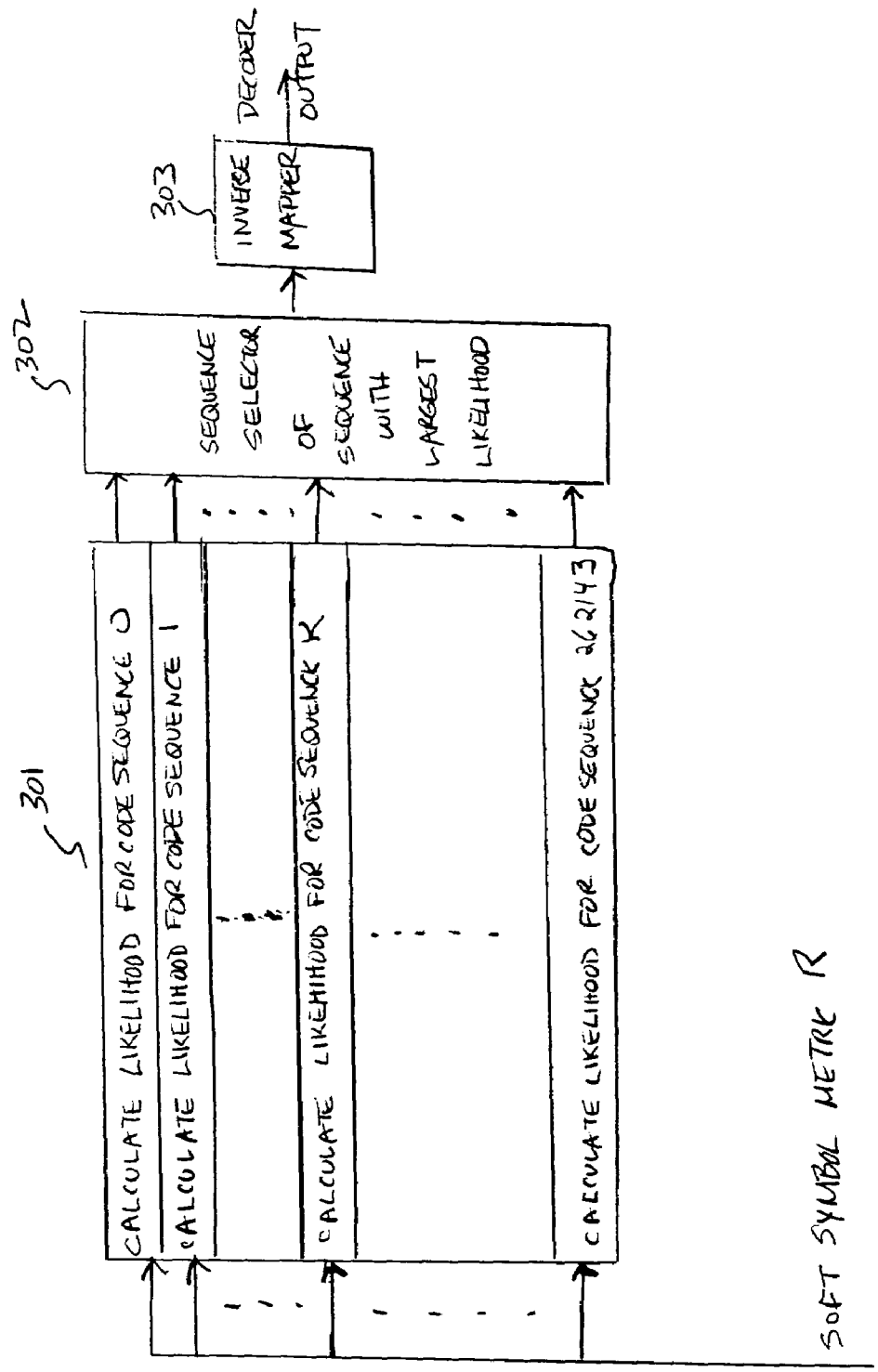
FIG. 3 is a conceptual block diagram of a Viterbi decoder for an exemplary input block consisting of 10 data bits and 8 CRC bits.

As afore noted, if the encoder 105 is a convolutional encoder, the decoder 112 is a Viterbi decoder, which is a maximum likelihood sequence detector, i.e., it selects the code sequence that has the largest likelihood. Since a one-to-one mapping exists between the uncoded bit stream at the input to the encoder 105 and the coded sequence at the output of the encoder, the decoder 112 can perform an inverse mapping once the code sequence with the maximum likelihood is chosen. The output of the inverse mapping is the Viterbi decoder output. A conceptual block diagram of a Viterbi decoder for the exemplary 10-bit data, 8-bit CRC, total 18-bit input is shown in FIG. 3. Since there are only 10-bits of data, there are $2^{10}$ possible bit streams that can be transmitted by the transmitter since the 8-bit CRC part is directly dependent on the bits in the data part once the CRC polynomial and generator initial state are given. In FIG. 3, the soft symbol metric R: $\{r_0 \ldots r_{35}\}$ at the output of the demodulator 111 in FIG. 1 is inputted to calculating device 301, which calculates the likelihood of each possible code sequence. Since the Viterbi decoder assumes no CRC structure, there are $2^{18}$ possible transmitted sequences. Thus, calculating device 301 calculates the likelihood for each and every one of the $2^{18}$ (262,144) sequences. The likelihood that a particular input sequence has been transmitted is equal (with a constant scaling factor) to the exponential of the inner product of the corresponding coded sequence at the output of the modulator and the input of input soft bit metric sequence. Selector 302 chooses the sequence with the largest likelihood and inverse mapper 303 performs an inverse mapping on the selected sequence to produce the decoder output.

Figure 4:
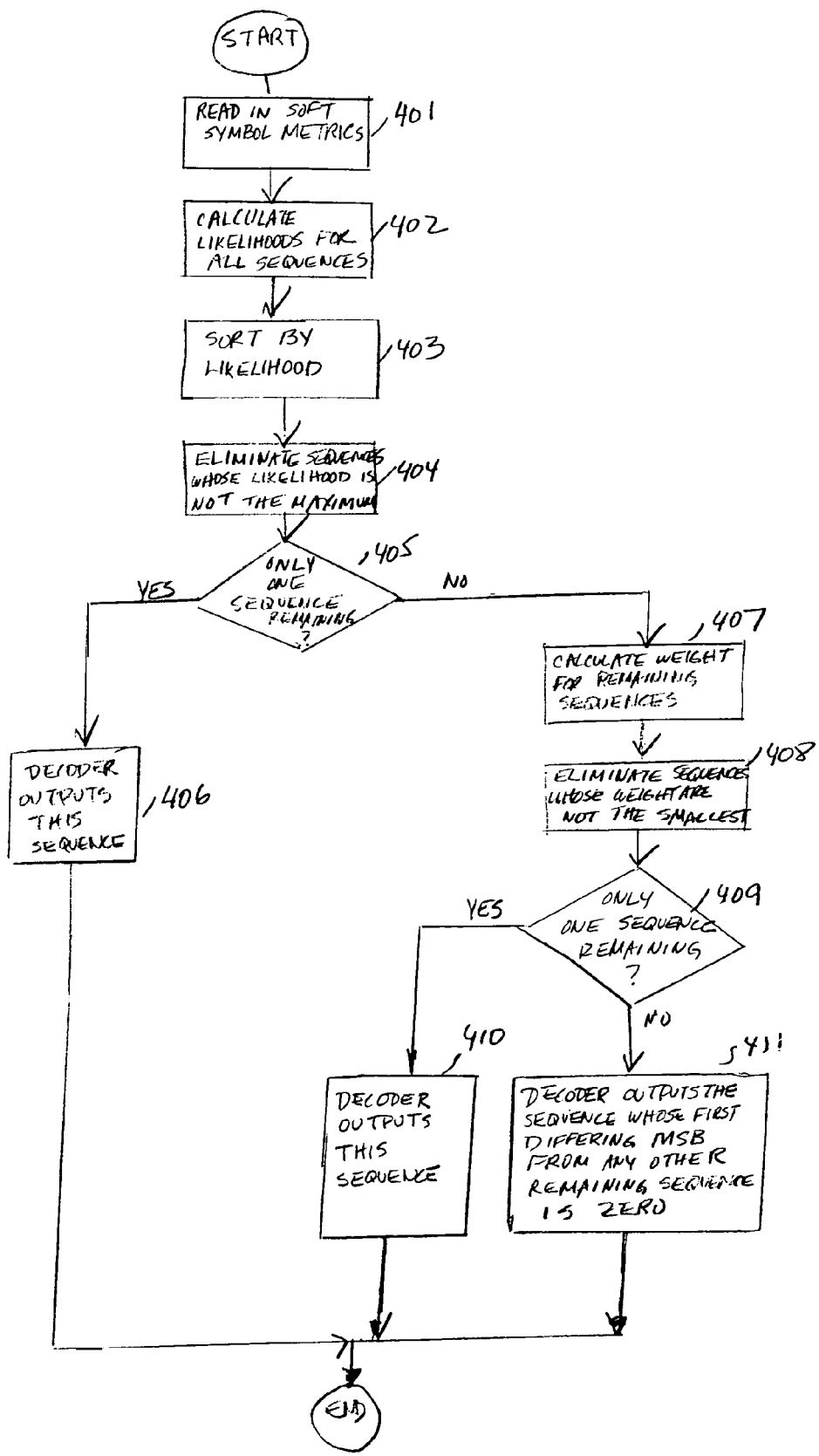
FIG. 4 is a flowchart of a prior art methodology used by the Viterbi decoder in FIG. 3 to determine an output sequence.

FIG. 4 is a flowchart of the prior art methodology used by the Viterbi decoder in FIG. 3 to determine an output sequence. At step 401, the soft symbol metric values for a data block are read in. At step 402, the likelihood for each possible coded sequence is calculated from these soft symbol metric values. At step 403, these coded sequences are sorted in descending order by their calculated likelihood. At step 404, those sequences whose likelihood values are not the maximum are eliminated. At step 405, a determination is made whether there exists more than one sequence whose likelihood is a maximum. If only one such sequence exists, then, at step 406, the decoder outputs that sequence. If more than one sequence exists that has the same maximum likelihood, then, at step 407, the weight for each of such sequences is calculated, where weight is equal to the count of non-zero-valued bits in the sequence. At step 408, sequences whose weights are not the smallest are eliminated. At step 409, a determination is made whether there exists only one such sequence with the smallest weight. If only one such sequence exists with a smallest weight, then, at step 410, the decoder outputs this sequence. If more than one sequence exists whose weight is the smallest, then, at step 411, the decoder outputs the sequence amongst those whose first differing most significant bit (MSB) from any other of these sequences is a ZERO.

As previously described, the problem with this methodology is that when then the received signal is weak, there is a high probability that multiple code sequences will have the same maximum likelihood. The all-ZERO sequence will always be among those sequences having that same maximum likelihood. Since the all-ZERO sequence has a zero weight (the number of non-zero bits equals zero), the all-ZERO sequence is the sequence that is selected and outputted.

The all-ZERO sequence, with 10 ZERO data bits and 8 ZERO CRC bits results in a CRC Pass regardless of what bit stream has actually been sent by the transmitter, and not a CRC Fail, which is what is desired under such weak signal conditions where the received signal is in error.

Figure 5:
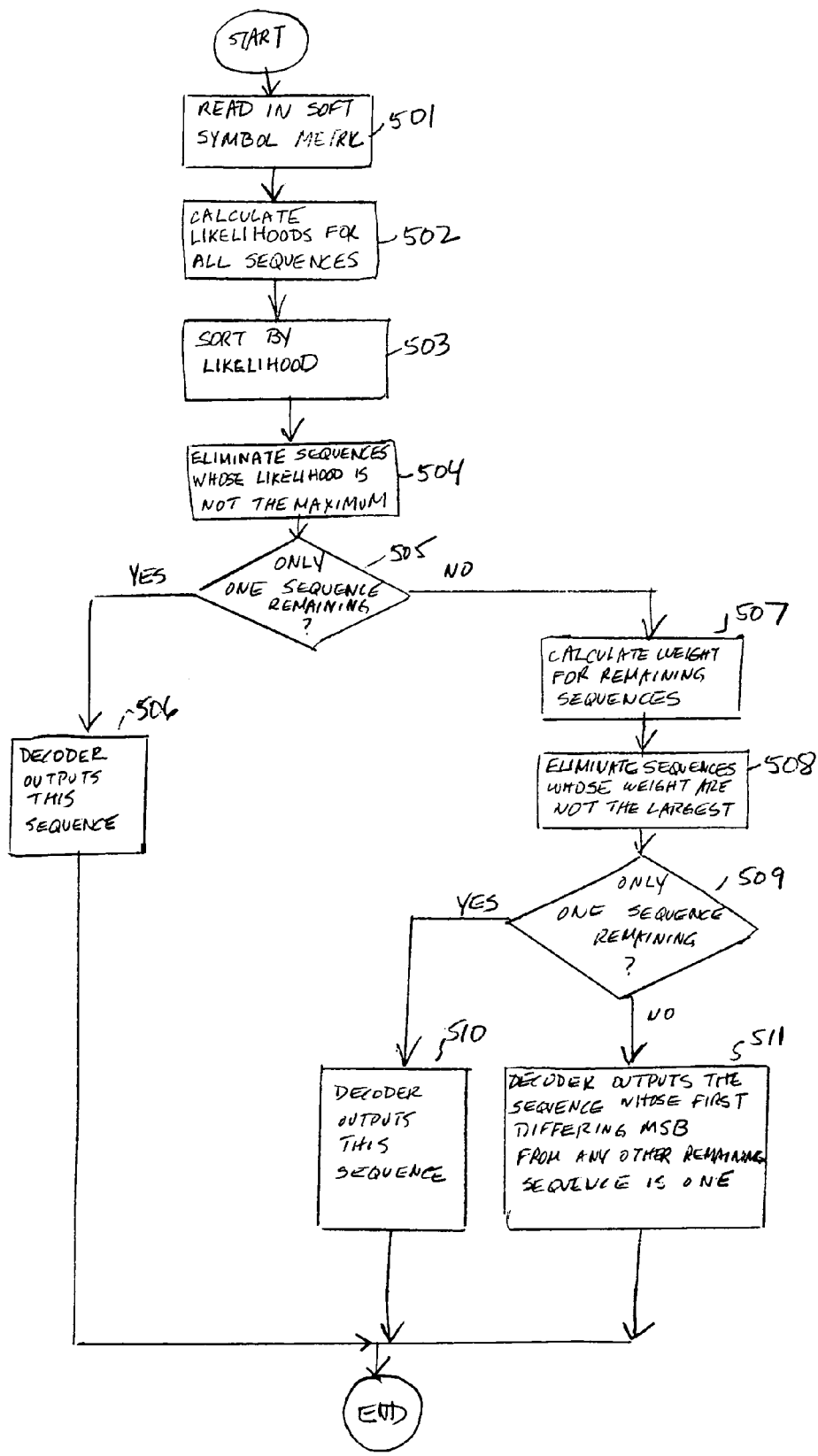
FIG. 5 is a flowchart illustrating a decoding methodology for a Viterbi decoder of FIG. 3 in accordance with an embodiment of the present invention.

FIG. 5 illustrates a decoding methodology in accordance with an embodiment of the present invention that avoids this problem. At step 501, the soft symbol metrics for a data block are read in. As before, at step 502, the likelihood for each possible coded sequence is calculated from the read-in soft symbol metrics. As before, at step 503, these sequences are sorted in descending order by their calculated likelihood. As before, at step 504, those sequences whose likelihood is not the maximum are eliminated. As before, at step 505, a determination is made whether there exists more than one sequence whose likelihood is a maximum. If only one such sequence exists, then, at step 506, the decoder outputs that sequence. As before, if more than one sequence exists that has the same maximum likelihood, at step 507, the weight for each of such sequence is calculated. At step 508, however, sequences whose weights are not the largest are eliminated. At step 509, a determination is made whether there exists only one such sequence with the largest weight. If only one such sequence exists with a largest weight, then, at step 510, the decoder outputs this sequence. If more than one sequence exists whose weight is the largest, at step 511, the decoder outputs the sequence amongst those whose first differing MSB from any other of these sequences is a ONE.

With this methodology, since the all-ZERO sequence will always be the sequence that has the smallest weight amongst those sequences whose likelihood is the maximum, the decoder will output another of those sequences, specifically the one whose weight is the largest. When a CRC is performed on the data portion of this selected sequence, with high probability the calculated CRC will not match the 8-bit CRC portion of the selected. Thus, for the weak signal condition, the desired CRC Fail results.

Although the above-described embodiment at step 508 eliminates sequences whose weight are not the largest, other embodiments could achieve the same advantages by selecting any sequence to output from among those with the maximum likelihood whose weight is greater than the maximum likelihood sequence whose weight is the minimum. The selected sequence will thus be one that produces the desired CRC fail with high probability. Alternatively, a tie in likelihood values could be broken by randomly picking a sequence from among all the multiple sequences with equal maximum likelihoods, or from among the multiple sequences with equal maximum likelihoods excluding the sequence with minimum weight. Although described in conjunction with a convolutional coder and convolutional Viterbi decoder, the same principles could be applied to any other coder that codes blocks of data and a decoder that decodes those blocks based on determined likelihoods, such as, for example, a block coder and block decoder, known in the art.

When a turbo encoder is used to encode the 18-bit data block, a turbo decoder is used to decode the received turbo code. The turbo decoder is an approximation of maximum likelihood bit detection in that it calculates the likelihood of each individual bit based on the input soft symbol metric sequence values. Since each bit has two possible values, a ZERO and a ONE, there are two likelihood values for each bit, namely the likelihood that a bit has a value ZERO and the likelihood that the bit has a value ONE. The decoder chooses the value for each bit that gives a larger likelihood.

The likelihood that bit i has a bit value of ZERO, for any i=0 to i=17, is equal (with a constant scaling factor) to the sum of the exponential of each and every inner-product of: (every code sequence at the output of the modulator that has bit i=ZERO) and (the input soft symbol metric sequence). Similarly, the likelihood that bit i has a bit value of ONE, for any i=0 to i=17, is equal (with a constant scaling factor) to the sum of the exponential of each and every inner-product of: (every code sequence at the output of the modulator that has bit i=ONE) and (the input soft symbol metric sequence).

Figure 6:
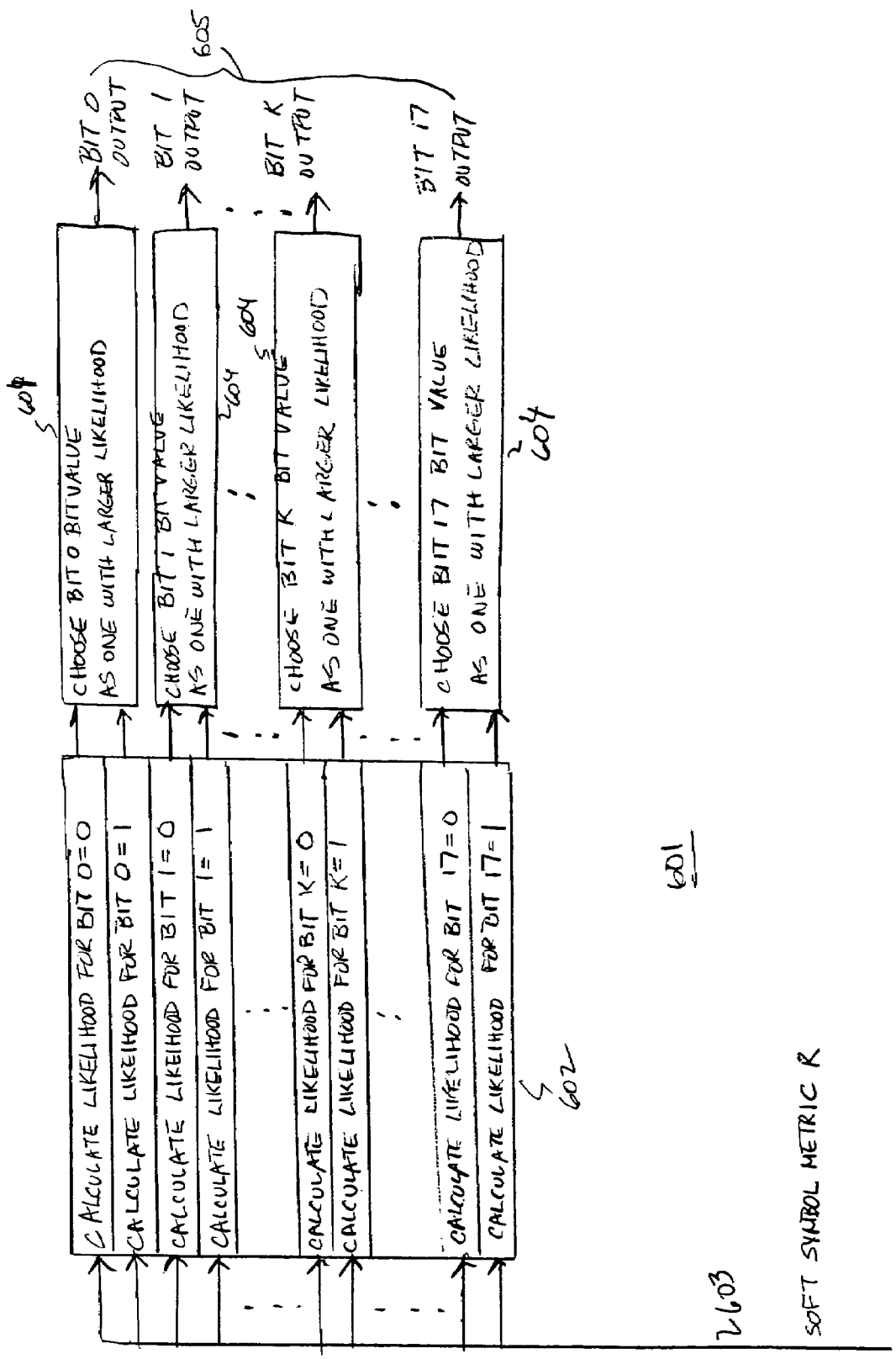
FIG. 6 is a conceptual block diagram of a turbo decoder for an exemplary input block consisting of 10 data bits and 8 CRC bits.

FIG. 6 is a block diagram showing the architecture of a turbo decoder 601 for an exemplary input block consisting of 10 data bits and 8 CRC bits. As noted above, since the 8 CRC bits are decided by the 10 data bits, there are only $2^{10}$ possible bit streams that can be transmitted. The turbo decoder 601, however, assumes no CRC structure so that from the decoder's point of view there are $2^{18}$ possible received sequences. Calculating device 602 thus calculates the likelihood for each of the 18 bits from the soft symbol metric values on input 603. Thus, as noted in FIG. 6, the likelihood that bit i=0 and bit i=1 is calculated for each i, for i=0 to i=17 by calculating device 602. Comparator devices 604 then select the bit value with the larger likelihood for each of the 18 bits, which are outputted on outputs 605.

Figure 7:
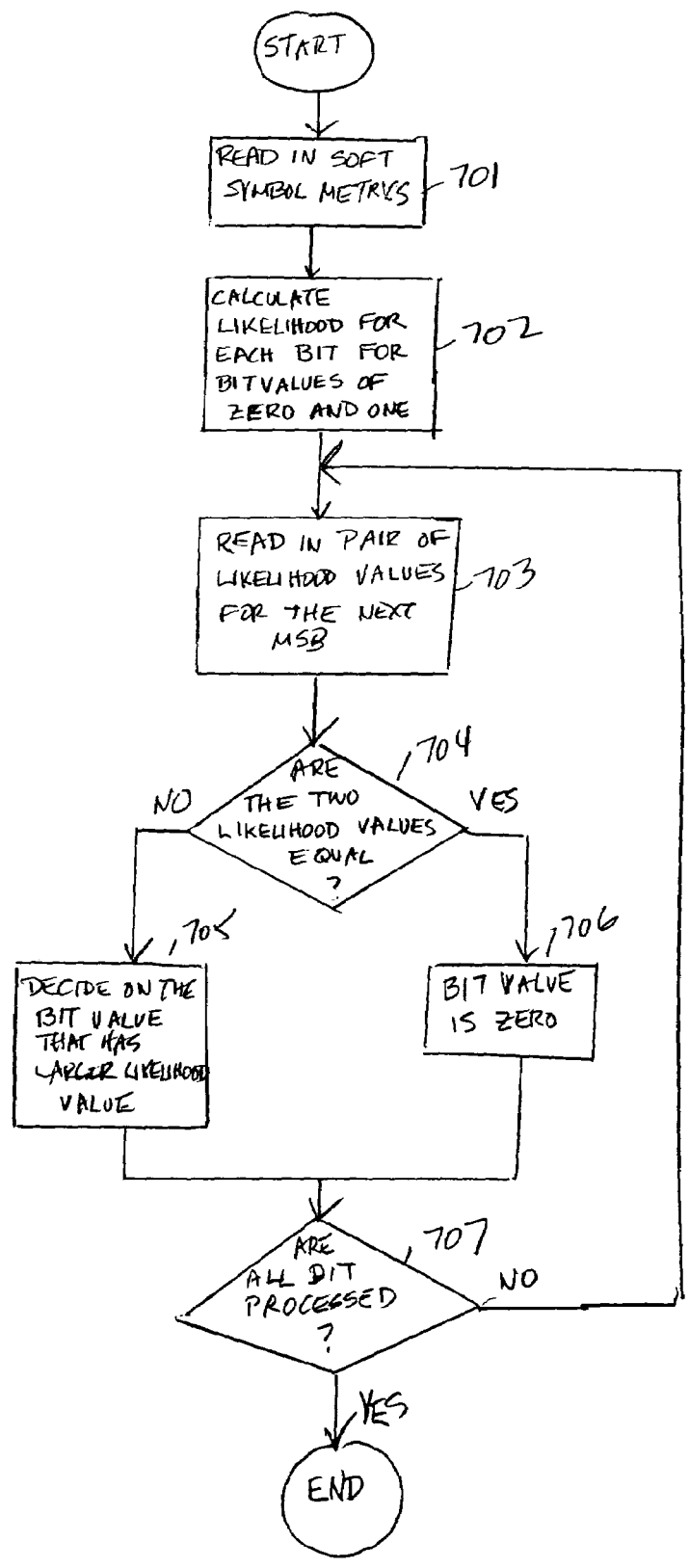
FIG. 7 is a flowchart or a prior art methodology used by the turbo decoder of FIG. 6 to determine an output sequence.

When the received signal is weak, there is a high probability that the two likelihood values for a bit are the same for all the bits in the data block. FIG. 7 is a block diagram of the turbo decoder processing performed by the turbo decoder of FIG. 6 in the prior art. At step 701, the soft symbol metric values are read in. At step 702, the likelihoods for each bit being a ZERO and a ONE are calculated. At step 703, a pair of likelihood values for a bit is read in, starting with the MSB. At step 704, a determination is made whether for a bit, the two likelihood values are equal. If not, at step 705, the bit value that gives the larger likelihood value is selected. If, at step 704, the two likelihood values are equal, then, at step 706, a bit value of ZERO is decided upon. At step 707, regardless of what bit value had been decided upon, a determination is made whether all the bits in the data have been processed. If yes, then processing of the data block is done. If not, the next pair of likelihood values for the next bit is read in and the process repeats until all bits have been processed. Thus, when the signal is weak, and the two likelihood values for a bit are the same, the decoder produces an all-ZERO decoded bit stream. As previously described, this results in a CRC check Pass, regardless of the bit stream actually transmitted.

Figure 8:
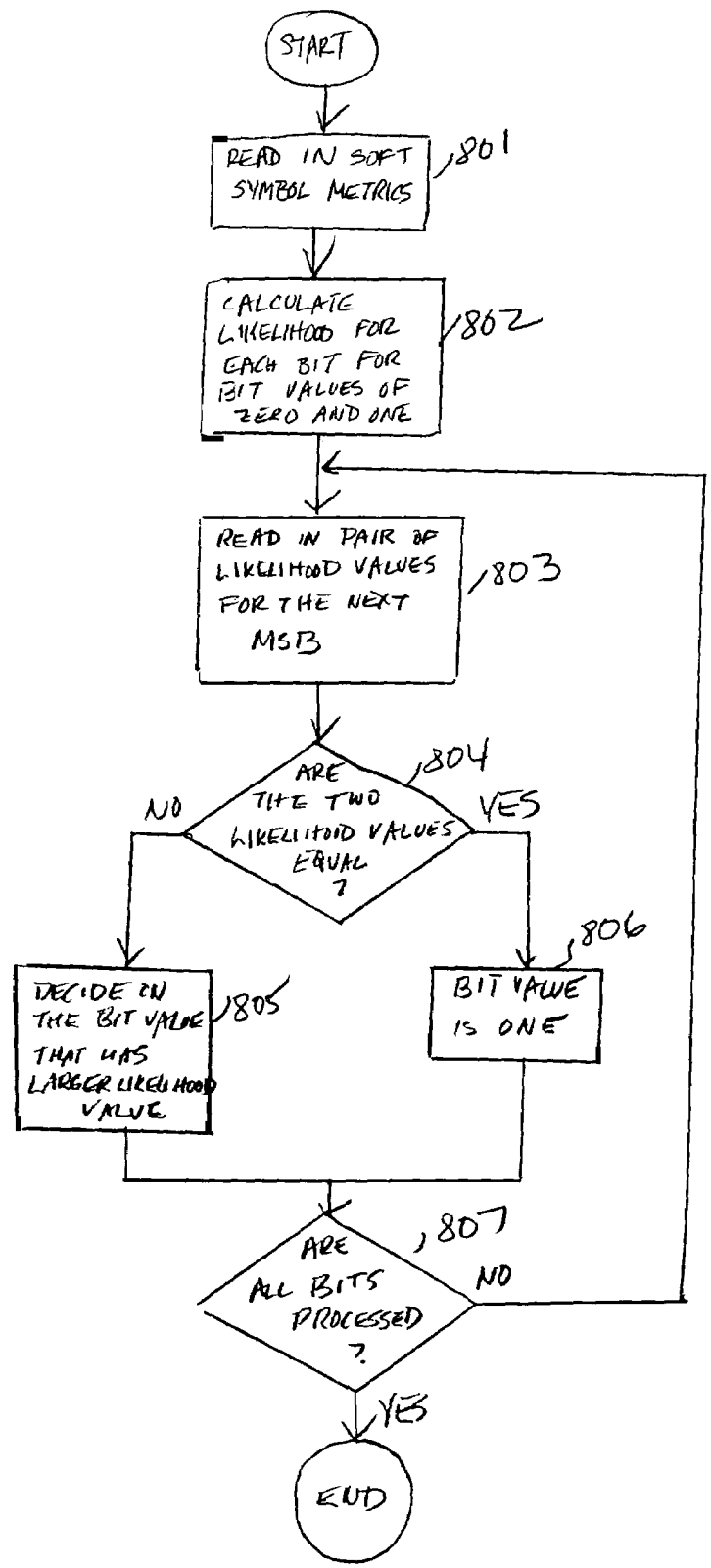
FIG. 8 is a flowchart illustrating a decoding methodology for a turbo decoder of FIG. 6 in accordance with an embodiment of the present invention.

FIG. 8 is a flowchart of the turbo decoder processing performed by an embodiment of a turbo decoder in accordance with an embodiment of the present invention. As before, at step 801, the soft symbol metric values are read in. As before, at step 802, the likelihoods for each bit value being a ZERO and a ONE are calculated. As before, at step 803, a pair of likelihood values for a bit is read in, starting with the MSB. As before, at step 804, a determination is made whether for a bit, the two likelihood values are equal. As before, if not, at step 805, the bit value that gives the larger likelihood value is decided upon. However; if, at step 804, the two likelihood values are equal, then, at step 806, a bit value of ONE is decided upon. At step 807, regardless of what bit value had been decided upon, a determination is made whether all the bits in the data have been processed. If yes, then processing of the data block is done. If not, the next pair of likelihood values for the next bit is read in. Thus, when the signal is weak, and the two likelihood values for a bit are the same, the decoder produces an all-ONE decoded bit stream. When the CRC check is performed on this all-ONE data block, a CRC check Fail results instead of a CRC check Pass, thus preventing passing on of the unreliable data block for further processing.

In an alternative embodiment, when the likelihood values of a bit for a ONE and ZERO are determined to be equal, the bit value can be randomly selected. Since the probability of randomly selecting all bits to be ZERO is $\frac{1}{2}^{18}$ for an 18-bit sequence, it would be highly unlikely to produce the all ZERO sequence that would result in a CRC pass.

While the particular invention has been described with reference to the illustrative embodiment, this description should not be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Further, the invention may be implemented in different locations, such as at a mobile terminal (UE), a base station (NodeB); a base station controller (in UMTS terminology, a Radio Network Controller [RNC]) and/or a mobile switching center (in UMTS terminology, a mobile service switching center [MSC]), or elsewhere depending upon in what type of system the invention is employed. Moreover, processing circuitry required to implement and use the described invention may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention. It is therefore contemplated that the appended claims will cover any such modifications or embodiments as fall within the true scope of the invention.

The invention claimed is:

1. A method at a decoder comprising:
   selecting for output one of a plurality of sequences of bits, each of the plurality of sequences being determined to have the same maximum likelihood based on a plurality of soft symbol metrics for a data block, the selection being performed based on a plurality of weights associated with the plurality of sequences such that the selected sequence has a weight that is greater than a minimum value of the plurality of weights the weight of each sequence being determined by a number of non-zero bits in the sequence.

2. The method of claim 1, comprising determining the plurality of weights for each of the plurality of sequences having the maximum likelihood.

3. The method of claim 2, wherein determining the plurality of weights for each of the plurality of sequences having the maximum likelihood comprises summing the number of non-zero bits in each of the plurality of sequences.

4. The method of claim 1 wherein the method is performed at a decoder in a receiver in a wireless communications system.

5. The method of claim 4 wherein an all-ZERO decoder output is avoided in the presence of weak signal conditions.

6. A method at a decoder comprising:
   selecting for output one of a first plurality of sequences of bits, each of the first plurality of sequences being determined to have the same maximum likelihood based on a plurality of soft symbol metrics for a data block, the selected sequence being selected randomly from a second plurality of sequences, the second plurality of sequences being selected from the first plurality of sequences based on a plurality of weights associated with the first plurality of sequences such that the each of the sequences in the second plurality of sequences has a weight that exceeds a minimum value of the plurality of weights the weight of each sequence being determined by a number of non-zero bits in the sequence.

7. The method of claim 6, comprising determining the plurality of weights for each of the plurality of sequences having the maximum likelihood.

8. The method of claim 7, wherein determining the plurality of weights for each of the plurality of sequences having the maximum likelihood comprises summing the number of non-zero bits in each of the plurality of sequences.

9. The method of claim 8 wherein an all-ZERO decoder output is avoided with high probability in the presence of weak signal conditions.

* * * * *